United States Patent [19]
Fry

[11] Patent Number: 4,956,040
[45] Date of Patent: Sep. 11, 1990

[54] METHOD OF ADHERING HOLOGRAMS TO TEXTILE WEARING APPAREL

[75] Inventor: David Fry, Creve Coeur, Md.

[73] Assignee: Diversified Graphics, Ltd., Hazelwood, Mo.

[21] Appl. No.: 214,396

[22] Filed: Jul. 1, 1988

[51] Int. Cl.[5] ........................ B32B 31/00; A47G 1/12

[52] U.S. Cl. ................................ 156/267; 156/308.4; 2/244; 40/1.5; 428/14; 428/203

[58] Field of Search ................ 156/70, 251, 267, 292, 156/308.4, 101, 107; 428/13, 14, 192, 203; 2/244, 245, 256; 40/159, 1.5

[56] References Cited

U.S. PATENT DOCUMENTS

| | | | |
|---|---|---|---|
| 2,271,946 | 2/1942 | Miller | 428/13 |
| 2,706,833 | 4/1955 | Doherty | 156/303.1 |
| 2,932,913 | 4/1960 | Hannon | 156/308.4 |
| 3,816,211 | 6/1974 | Haigh | 2/246 |
| 4,043,858 | 8/1977 | Dantowitz | 156/267 |
| 4,243,458 | 1/1981 | Giulie | 156/303.1 |

*Primary Examiner*—Robert A. Dawson
*Assistant Examiner*—Louis Falasco
*Attorney, Agent, or Firm*—Senniger, Powers, Leavitt and Roedel

[57] ABSTRACT

A method for adhering holograms to textile wearing apparel involving the steps of laminating a precut hologram between a clear polyester coating and an adhesive scrim backing to envelope the hologram and protect it from moisture and scuffing, cutting margins away from the laminated hologram to form an enveloped hologram, and applying the enveloped hologram to wearing apparel at a temperature of approximately 270° to 300° F. under a pressure of approximately 30 to 50 psi for a period of approximately 8 to 15 seconds. The hologram becomes firmly adhered to the wearing apparel and remains impervious to moisture after repeated machine washing and drying cycles.

4 Claims, No Drawings

METHOD OF ADHERING HOLOGRAMS TO TEXTILE WEARING APPAREL

BACKGROUND OF THE INVENTION

This invention relates to a method for adhering holograms to textile wearing apparel and, more particularly, to such a method which firmly adheres holograms to wearing apparel and protects the holograms from moisture and scuffing even after being subjected to repeated washing and drying cycles.

Holography is a three-dimensional imaging technique utilized to produce holograms. Holograms became practical in 1962 with the advent of the laser which Provided a source of coherent (single wavelength) light necessary for the recording of dimensional information. To create a hologram, the laser light is split into two beams: one illuminates the object being shot (object beam) and the other illuminates the film plate onto which the hologram will be recorded (reference beam). When the object beam reflects from the object to the film plate, an interference pattern, much like the colliding ripples in a pond, occurs. This microscopic interference pattern is formed of light and dark places; when re-illuminated properly, it will reconstruct a three-dimensional image of the object appearing in its original position. An embossed hologram is created by transferring the interference pattern onto a plastic film. Typically, holograms are printed onto thin (2 mil) plastic such as mylar film which is aluminized to increase reflectivity. Holograms thus provide dramatic asthetic and ornamental effects in combining, for example, the brilliant colors of two dimensions in the foreground with a detailed three dimensional background.

In the past, holograms have been utilized in Packaged Product premiums, greeting cards, magazine covers and the like. Efforts have also been made to apply holograms to textile wearing apparel such as T-shirts, sweatshirts, caps/headgear and the like. Such efforts have, however, been unsuccessful and it has been found that the holograms would not adhere firmly to textile materials and/or would tend to peel away from such materials after the latter are subjected to conventional machine washing and drying cycles.

There has been an unfulfilled need, therefore, for an improved method for adhering holograms to textile wearing apparel so that the holograms remain firmly adhered to the apparel and remain capable of sustaining many machine washing and drying cycles.

SUMMARY OF THE INVENTION

Among the several objects of the invention may be noted the provision of a novel method for firmly adhering holograms to textile wearing apparel such as sweatshirts, caps and the like; the provision of such a method which renders the hologram so adhered impervious to moisture and protects it against scratching and scuffing; the provision of a method of this character which enables the textile wearing apparel to be subjected to repeated machine washing and drying cycles without appreciable adverse effect; and the provision of novel textile wearing apparel having a hologram adhered thereto and which promises unique three dimensional visual effects. Other objects and features will be in part apparent and in part pointed out hereinafter.

Briefly, the present invention is directed to a method for adhering holograms to textile wearing apparel which comprises the steps of (a) laminating a precut hologram between a clear polyester coating on the upper surface of the hologram and an adhesive skrim backing on the lower surface of the hologram to envelope the hologram and protect it from moisture and scuffing, the polyester coating being sealed to the upper surface of the adhesive skrim backing around margins of the backing extending outwardly from the hologram and the adhesive skrim backing being adapted to adhere the hologram to textile wearing apparel;

(b) cutting the margins away from the resulting laminated hologram to form an enveloped hologram; and (c) applying the enveloped hologram to textile wearing apparel at a temperature of approximately 270° F. to 300° F. and under a pressure of approximately 30 to 50 psi for a period of approximately 8 to 15 seconds whereby the hologram becomes firmly adhered to the textile wearing apparel.

DESCRIPTION OF THE PREFERRED EMBODIMENTS

In accordance with the present invention, I have now found that holograms may be firmly, conveniently and effectively adhered to textile substrates or wearing apparel by following certain method steps which firm adherement of the hologram to the substrate and protect the hologram from moisture, scuffing and scratching as may occur during repeated washing and drying cycles. First of all, a precut hologram which may be in roll form is applied face up to the sticky or adhesive side of a clear polyester coating while the protective paper backing is separated from the back or lower surface of the hologram. The hologram thus has a clear polyester coating adhered to its upper surface which does not interfere with the three dimensional visual effects of the hologram when viewed through the coating. This clear polyester coating may be of any type well known to the art or industry and which provides a clear protective coating for the face or upper surface of the hologram.

The hologram with the clear polyester coating on its upper surface is then fed into a pressure/heat roller laminator in which the lower surface or back of the hologram is adhered to an adhesive skrim backing so that the hologram is sandwiched or enveloped between the clear PolYester top coating and the adhesive skrim backing. The adhesive skrim backing is also comprised of a polyester adhesive which is characterized by having a fast crystallization rate, a high rate of fusion and the capability of bonding to a wide range of natural, synthetic and metallic substrates. The resulting bonds between the polYester adhesive skrim backing and such substrates exhibit good ultraviolet resistance, stable aging and chemical resistance to many common solvents. Such a polyester adhesive is that known under the trade designation "3895 Laminating Adhesive" produced by the 3M Company. The polYester adhesive skrim backing has margins extending outwardly from the edges of the hologram, the polYester top coating being sealed to the skrim backing around these margins so that the hologram is completely enveloped, encased or sandwiched between the top coating and the backing. These margins are then die cut away from the laminated hologram to produce an enveloped hologram which is ready for application to textile wearing apparel.

The enveloped hologram is then applied to a textile substrate such as a T-shirt or sweatshirt or cap under heat and Pressure conditions so that the polyester adhesive skrim backing is softened and fused to the textile substrate. In accordance with the invention, it has been found that the hologram should be applied to the textile substrate at a temperature of approximately 270° F. to 300° F., preferably 275° F., and under a pressure of approximately 30 to 50 psi, preferably 40 psi, for a period of approximately 8 to 15 seconds, preferably 15 seconds, in order to achieve firm and rigid adherement to the textile substrate. The characteristics of the polyester skrim backing contribute to the firm adherence of the hologram to the textile substrate under these conditions.

The resulting textile wearing apparel having a hologram adhered thereto and produced by the above-described method has been found, in actual test runs, to be capable of withstanding at least 20 machine wash and dry cycles without the hologram peeling away or otherwise losing its adherence to the textile apparel substrate. Moreover, because of the polyester top coating, the hologram remains impervious to water or moisture and is also protected from scratching or scuffing such as might normally result from contact with metallic objects such as belt buckles, zippers or the like. Further, and importantly, the method of the invention permits a hologram to be firmly adhered to textile wearing apparel without adversely affecting the three dimensional effect of the images conveyed to the viewer by the hologram as it appears on the wearing apparel. The method of the invention thus represents a practical, effective and convenient means of producing wearing apparel having a hologram adhered thereto in a firm and protected form and without adversely affecting the function of the hologram.

In view of the above, it will be seen that the several objects of the invention are achieved and other advantageous results attained.

As various changes could be made in the above methods and Products without departing from the scope of the invention, it is intended that all matter contained in the above shall be interpreted as illustrative and not in a limiting sense.

What is claimed is:

1. A method for adhering holograms to textile wearing apparel comprising the steps of:

(a) laminating a precut hologram having an upper surface and a lower surface between a clear polyester coating on the upper surface of said hologram and an adhesive skrim backing on the lower surface of said hologram to envelope the hologram and protect it from moisture and scuffing, said polyester coating being sealed to said adhesive skrim backing around margins of said backing extending outwardly from said hologram and said adhesive skrim backing being adapted to adhere said hologram to textile wearing apparel;

(b) cutting said margins away from the resulting laminated hologram to form an enveloped hologram; and (c) applying the enveloped hologram to textile wearing apparel at a temperature of approximately 270° F. to 300° F. and under a pressure of approximately 30 to 50 psi for a period of approximately 8 to 15 seconds whereby said hologram becomes firmly adhered to said textile wearing apparel.

2. A method as set forth in claim 1 wherein said adhesive skrim backing is composed of a polyester adhesive which is characterized by a fast crystallization rate, high heat of fusion and chemical resistance to common solvents.

3. A method as set forth in claim 1 wherein said temperature is approximately 275° F. and said pressure is approximately 40 psi.

4. A method as set forth in claim 3 wherein said temperature and pressure are applied for a period of approximately 15 seconds.

* * * * *